United States Patent
Kibby

(10) Patent No.: US 6,331,573 B1
(45) Date of Patent: Dec. 18, 2001

(54) INCREASED LIQUID SENSITIVITY DURING FISCHER-TROPSCH SYNTHESIS BY OLEFIN INCORPORATION

(75) Inventor: Charles L. Kibby, Benicia, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 09/515,693

(22) Filed: Feb. 29, 2000

(51) Int. Cl.$^7$ .............................. C07C 27/00; C07C 5/23; C07C 5/13

(52) U.S. Cl. ..................... 518/706; 518/700; 518/715; 518/719; 585/664; 585/734

(58) Field of Search ................................... 518/700, 706, 518/715, 719; 585/664

(56) References Cited

U.S. PATENT DOCUMENTS

| | | |
|---|---|---|
| 2,662,090 | 12/1953 | Scharmann . |
| 2,686,195 | 8/1954 | McAdams et al. . |
| 2,735,862 | 2/1956 | Buchman et al. . |
| 2,850,515 | 9/1958 | Riblett et al. . |
| 4,039,302 | 8/1977 | Khera . |
| 4,042,614 | 8/1977 | Vannice et al. . |
| 4,077,995 | 3/1978 | Khera . |
| 4,088,671 | 5/1978 | Kobylinski . |
| 4,151,190 | 4/1979 | Murchison et al. . |
| 4,171,320 | 10/1979 | Vannice et al. . |
| 4,206,134 | 6/1980 | Kugler et al. . |
| 4,347,121 | 8/1982 | Mayer et al. . |
| 4,507,517 | 3/1985 | Devries et al. . |
| 4,544,674 | 10/1985 | Fiato et al. . |
| 4,579,986 | 4/1986 | Sic . |
| 4,599,474 | 7/1986 | Devries et al. . |
| 4,622,308 | 11/1986 | Koikeda et al. . |
| 4,624,968 | 11/1986 | Kim et al. . |
| 4,704,487 | 11/1987 | Devries et al. . |
| 4,704,493 | 11/1987 | Devries et al. . |
| 4,709,108 | 11/1987 | Devries et al. . |
| 4,734,537 | 3/1988 | Devries et al. . |
| 4,754,092 | 6/1988 | Iglesia et al. . |
| 4,810,357 | 3/1989 | Chester et al. . |
| 4,814,533 | 3/1989 | Devries et al. . |
| 4,814,535 | 3/1989 | Yurchak . |
| 4,814,538 | 3/1989 | Devries et al. . |
| 5,162,284 | 11/1992 | Solled et al. . |
| 5,348,982 | 9/1994 | Herbolzheimer et al. . |
| 6,156,808 | * 12/2000 | Clark et al. .......................... 518/719 |

FOREIGN PATENT DOCUMENTS 2 050 859    1/1981   (GB) .

OTHER PUBLICATIONS

Khan, M.K.Z., et al., The synthesis of ligh hydrocarbons from carbon monoxide and hydrogen mixture over selected Metal Catalysts, ACS 173rd Symposium Series 64, Fuel Division, dIVISION, New Orleans, Mar. 1997 pp. 138–147.*

Amelse, J.A., et al., *Journal of Catalysis*, 72: pp. 95–110, 1981.

Corte, P., et al., *C.R. Acad. Sc. Paris*, 268, 1969.

Deckwer, W. D., et al., "Modeling the Fischer–Tropsch Synthesis in the Slurry Phase", *Ind. Eng. Chem. Process Des. dev., American Chemical Society*, 21(2): pp. 231–241, 1982.

*Gmelins Handbuch der Anorganische Chemie 8, Auflage*, p. 59, 1959.

Hu, Y., "Unconventional Olefin Processes", *Hydrocarbon Processing*, pp. 88–96, May, 1983.

Kibby, C. L., et al., "Hydrogenation of Olefins in the Presence of Carbon Monoxide on Supported Cobalt Catalysts", *Symposium on Mechanism of Fisher–Tropsch Chemistry Presented Before the Division of Petroleum Chemistry American Chemical Society*, Philadelphia Meeting, Aug. 26–31, 1984.

Kitzelmann, Dieter, et al., "Zur selektiven Hydrierung von Kohlenmonoxid zu $C_2$–bis $C_4$–Olefinen," *Chem. Ing. Tech.*, 49(6) pp. 463–468, 1977.

Kölbel, H., et al., "The Fischer–Tropsch Synthesis in the Liquid Phase", *Catal. Rev.–Sci. Eng.*, 21 (2): pp. 225–274, 1980.

Lo, Cary, et al., "Mössbauer and Magnetic Studies of Bifunctional Medium–Pore Zeolite–Iron Catalysts Used in Synthesis Gas Conversion," *American Chemical Society*, 194: pp. 573–588, 1981.

Nakamura, M. et al., "Fischer–Tropsch Synthesis with Iron–Cobalt Alloy Catalysts," *Stud. Surf. Sci. Catal.* 7, Pt/A, pp. 432–446, 1981.

Ramachandran, P. et al., "Bubble Column Slurry Reactor, Three–Phase Catalytic Reactors" *Topics in Chemical Engineering* Chapter 10, (Gordon and Broch Science publishers) pp. 308–332, 1983.

(List continued on next page.)

Primary Examiner—Johann Richter
Assistant Examiner—J. Parsa
(74) Attorney, Agent, or Firm—Burns, Doane, Swecker & Mathis, L.L.P.

(57) ABSTRACT

An integrated process for producing liquid fuels from syngas via a two-stage Fischer-Tropsch reaction is disclosed. The first stage of the Fischer-Tropsch chemistry is performed using conditions in which chain growth probabilities are relatively low to moderate, and the product of the reaction includes a relatively high proportion of low molecular ($C_{2-8}$) weight olefins and a relatively low proportion of high molecular weight ($C_{30}+$) waxes. The product from the first stage is fed into the second stage where the chain growth probabilities are relatively high. The wax and other paraffins produced in the first reaction are largely inert under these conditions. The light olefins compete with heavier olefins for chain initiation, and fewer chains will be initiated at $C_{20}+$. With most chains initiated at $C_{2-8}$, moderate chain growth probability will produce a relatively larger fraction in the $C_{5-12}$ range. In this manner, wax yield is minimized.

15 Claims, 3 Drawing Sheets

OTHER PUBLICATIONS

Shah et al., "Design parameters Estimations for Bubble Column Reactors", *AIChE Journal*, 28(3) 353–379, 1982.

Smith, David F., et al., "The Mechanism of the Formation of Higher Hydrocarbons From Water Gas," *J.A.C.S.* (*Journal of the American Chemical Society*), 52 pp. 3221–3232, 1930.

Stanfield, R., et al., *Journal of Catalysis*, No. 72(1) pp. 37–50, 1981.

Woude, F., et al., "Mössbauer Effect in Iron and Dilute Iron Based Alloys," *Physics Reports* (*Section C of Physics Letters*) 5(12): pp. 335–374, 1974.

Xu, L., et al., "Don't Rule Out Iron Catalysts for Fisher–Tropsch Synthesis", *Chemtech, American Chemical Society* 47–53, Jan. 1998.

\* cited by examiner

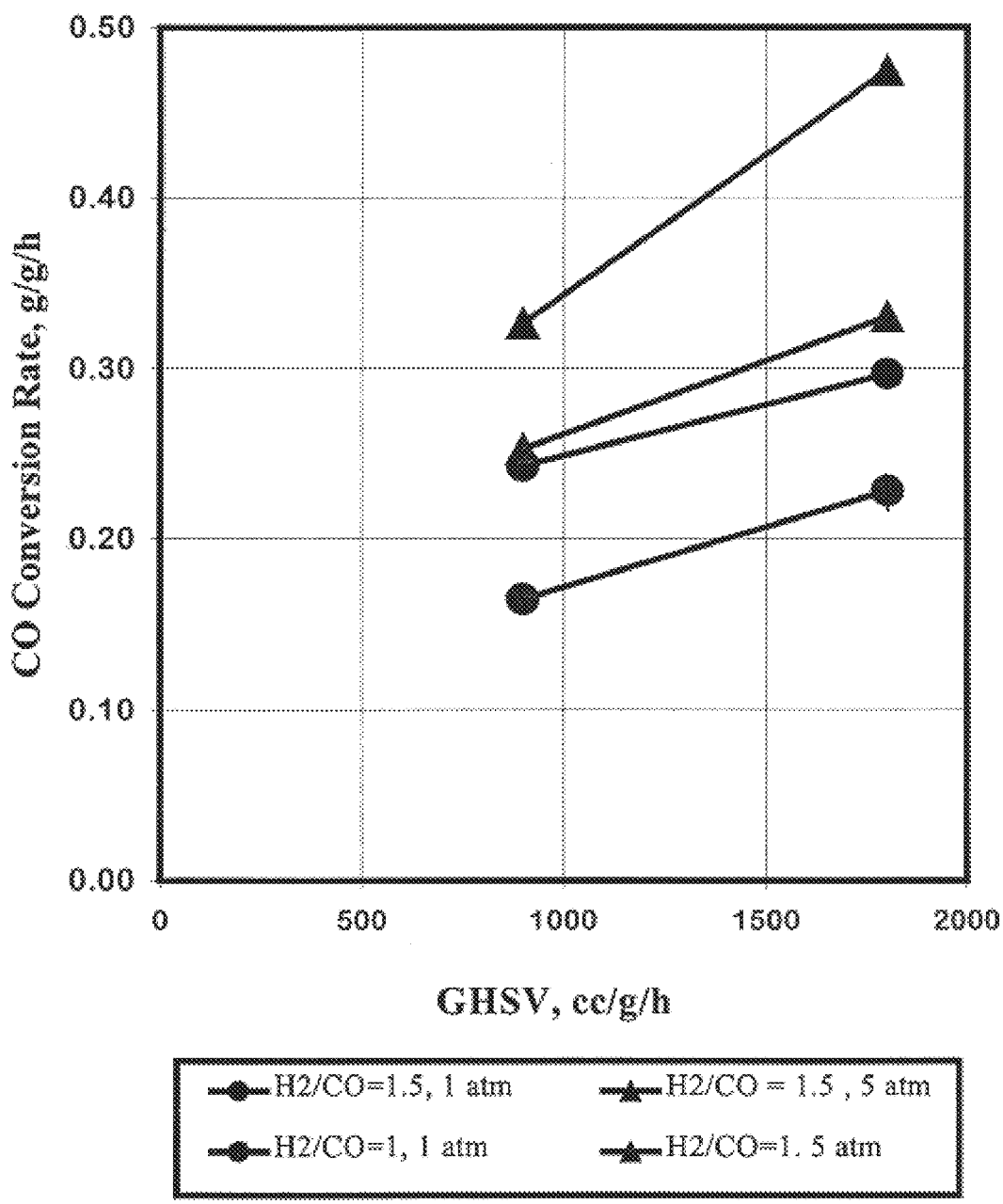

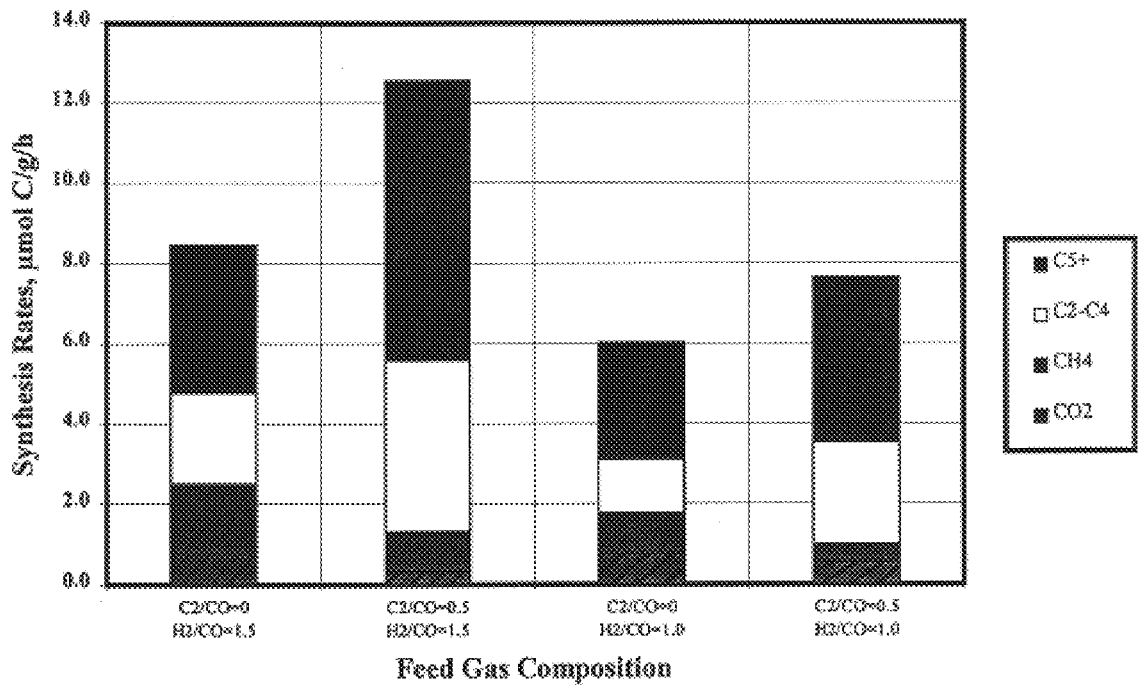
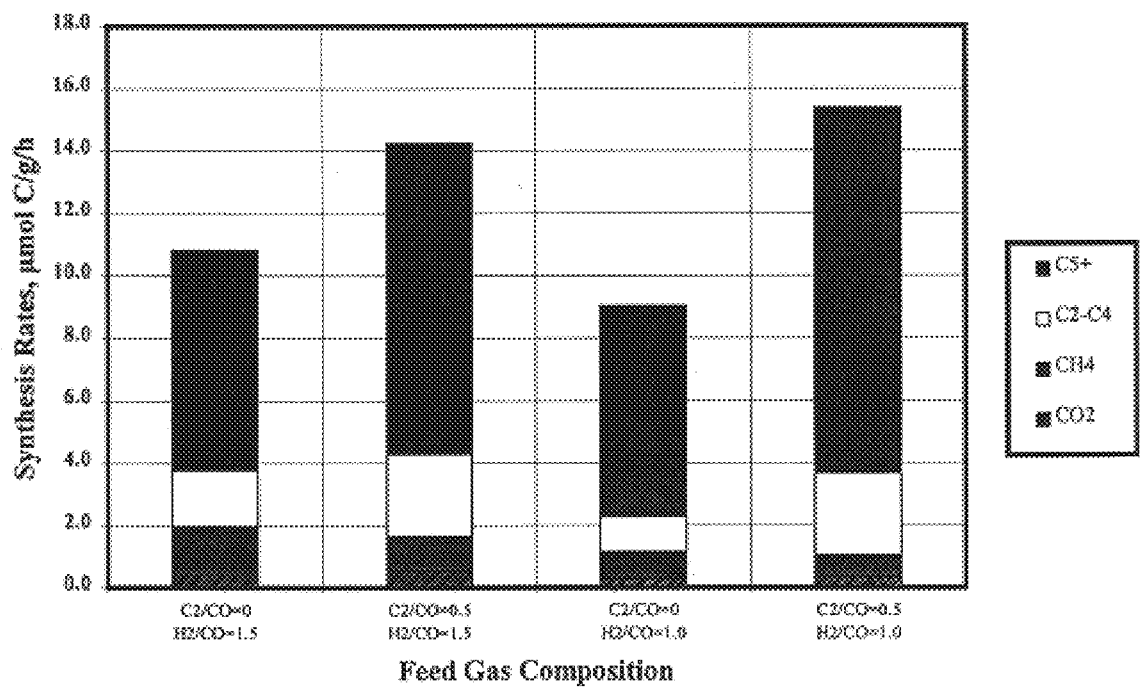

INCREASED LIQUID SENSITIVITY DURING FISCHER-TROPSCH SYNTHESIS BY OLEFIN INCORPORATION

BACKGROUND OF THE INVENTION

The majority of combustible fuel used in the world today is derived from crude oil. There are several limitations to using crude oil as a fuel source. Crude oil is in limited supply; it includes aromatic compounds believed to cause cancer, and contains sulfur and nitrogen-containing compounds that can adversely affect the environment, for example, by producing acid rain.

Combustible liquid fuels can also be prepared from natural gas. This involves converting the natural gas, which is mostly methane, to synthesis gas, or syngas, which is a mixture of carbon monoxide and hydrogen. An advantage of using fuels prepared from syngas is that they do not contain nitrogen and sulfur and generally do not contain aromatic compounds. Accordingly, they have minimal health and environmental impact.

Fischer-Tropsch chemistry is typically used to convert the syngas to a product stream that includes combustible fuel, among other products. A limitation associated with Fischer-Tropsch chemistry is that it tends to produce a broad spectrum of products, ranging from methane to wax. Product slates for syngas conversion over Fischer-Tropsch catalysts (Fe, Co and Ru) are controlled by polymerization kinetics with fairly constant chain growth probabilities, which fix the possible product distributions. Heavy products with a relatively high wax content are produced when chain growth probabilities are high. Methane is produced with high selectivity when chain growth probabilities are low.

Methane can be recirculated to ultimately yield combustible liquid fuel. Wax can be processed, for example, by hydrocracking and/or hydrotreating followed by oligomerization, to yield combustible liquid fuel. However, it would be advantageous to have new methods for providing a product stream from a Fischer-Tropsch process that has a higher proportion of combustible liquid fuel with less methane to recirculate and less wax to process.

One method used in the past to minimize methane production has been to incorporate olefins in the Fischer-Tropsch reaction. Work in the early 1930's used a roughly 1:1 ratio of hydrogen/carbon monoxide, and added olefins to the reaction mixture (Smith et al., *J.A.C.S.*, 52:3221 (1930). This tended to provide oxygenated material, which is not preferred. U.S. Pat. No. 4,754,092 to Iglesia et al. discloses incorporating olefins into a Fischer-Tropsch reaction, but does not specify the type of chain growth probabilities for the reaction, and discloses using a wide range of hydrogen/carbon monoxide ratios such that it would be difficult to predict whether the product would be oxygenated, olefinic, or saturated.

It would be advantageous to provide methods for improving product yields in Fischer-Tropsch reactions, while minimizing methane and oxygenate production. The present invention provides such methods.

SUMMARY OF THE INVENTION

In its broadest aspect, the present invention is directed to an integrated process for producing liquid fuels from syngas via a two-stage Fischer-Tropsch reaction. The first stage of the Fischer-Tropsch chemistry is performed using conditions in which chain growth probabilities are relatively low to moderate, and the product of the reaction includes a relatively high proportion of low molecular ($C_{2-8}$) weight olefins and a relatively low proportion of high molecular weight ($C_{30}+$) waxes.

The products of the first stage include methane, $C_{2-4}$ hydrocarbons, $C_5+$ hydrocarbons, water and carbon dioxide, as well as unreacted syngas. Optionally, but preferably, water produced in the first stage is substantially removed before the product stream is sent to the second stage. Optionally, the product is hydrotreated at this stage to remove any oxygenated products. Further, $C_5+$ hydrocarbons are preferably isolated. In one embodiment, at least a portion of the olefins is isomerized prior to being fed into the second stage.

The product from the first stage, after any optionally performed processing steps, is then fed into the second stage where the chain growth probabilities are relatively high. The wax and other paraffins produced in the first reaction are largely inert under these conditions. The light olefins compete with heavier olefins for chain initiation, and fewer chains will be initiated at $C_{20}+$. With most chains initiated at $C_{2-8}$, moderate chain growth probability will produce a relatively larger fraction in the $C_{5-12}$ range. In this manner, wax yield is minimized.

The syngas used in both stages preferably contains certain ratios of hydrogen to carbon monoxide. In the first stage, hydrogen/carbon monoxide ratios in excess of about 1.0/1.0 tend to provide less olefins and more hydrogenated products, although changing the temperature and/or pressure may mitigate these effects to some degree. In the second stage, using a cobalt-containing catalyst, a ratio of hydrogen to carbon monoxide greater than 1.5/1.0 tends to provide a product that is greater than 80% saturated. At a ratio of about 1.0/1.0, the product tends to include oxygenates and olefins.

In one embodiment, the Fischer-Tropsch synthesis with low to moderate chain growth probability is performed using an iron-containing catalyst in the first reactor, and Fischer-Tropsch synthesis with high chain growth probability is performed using a cobalt-containing catalyst in the second reactor.

BRIEF DESCRIPTION OF THE DRAWINGS

FIG. 1 is a graph comparing the CO conversion (%) vs gas hourly space velocity (GHSV) for the reaction in Example 1.

FIG. 2 is a graph comparing the synthesis rates ($\mu$mol C/g/h) vs feed gas composition for those experiments in Example 1 run at a pressure of 1 atm, a temperature of 200° C., and a GHSV of 1800 cc/g/h. The dark portion of the bar represents the $C_5+$ fraction. The white portion of the bar represents the $C_{2-4}$ fraction. The gray portion of the bar represents the $CH_4$ fraction. The gray portion of the bar with diagonal lines through it represents the $CO_2$ fraction.

FIG. 3 is a graph comparing the synthesis rates ($\mu$mol C/g/h) vs feed gas composition for those experiments in Example 1 run at a pressure of 5 atm, a temperature of 200° C., and a GHSV of 1800 cc/g/h. The dark portion of the bar represents the $C_5+$ fraction. The white portion of the bar represents the $C_{2-4}$ fraction. The gray portion of the bar represents the $CH_4$ fraction. The gray portion of the bar with diagonal lines through it represents the $CO_2$ fraction.

DETAILED DESCRIPTION OF THE INVENTION

Figure 4:
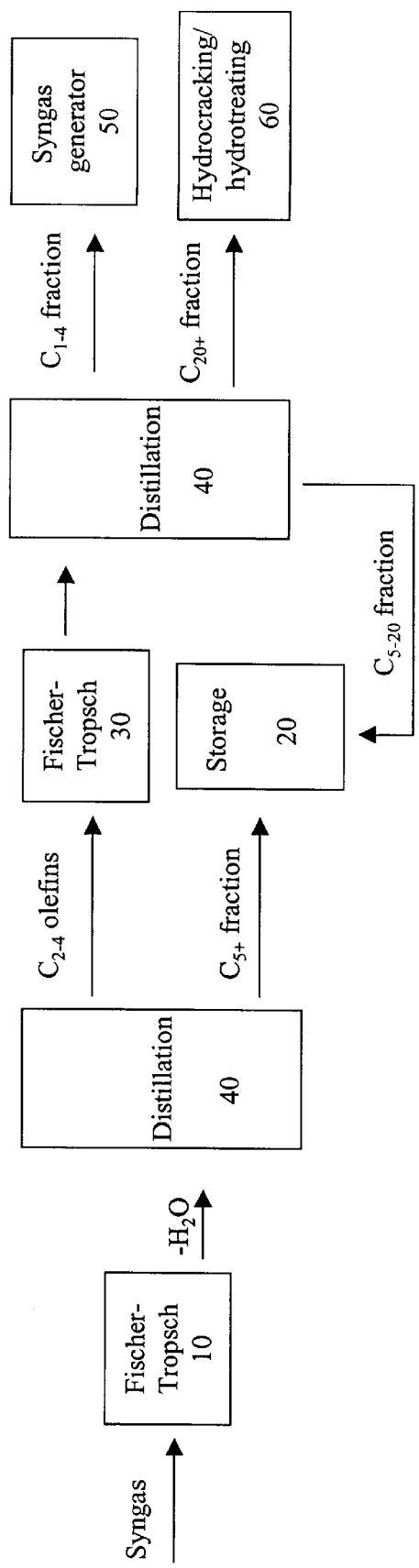
FIG. 4 is a schematic flow diagram representing one embodiment of the invention.

The present invention is directed to an integrated process for producing liquid fuels from syngas. As used herein, the term "integrated process" refers to a process comprising a sequence of steps, some of which may be parallel to other steps in the process, but which are interrelated or somehow dependent upon either earlier or later steps in the total process.

In Fischer-Tropsch chemistry, products with a relatively high molecular weight and with a relatively high selectivity for wax are produced when chain growth probabilities are high. Methane and lower molecular weight products, including a variety of low molecular weight ($C_{2-8}$) olefins, are produced with high selectivity when chain growth probabilities are low.

The process described herein includes a two stage Fischer-Tropsch reaction. The first stage of the Fischer-Tropsch chemistry is performed using conditions in which chain growth probabilities are relatively low to moderate, and the product of the reaction includes a relatively high proportion of low molecular ($C_{2-8}$) weight olefins and a relatively low proportion of high molecular weight ($C_{30}+$) waxes. For example, catalysts with low alpha values, i.e., between about 0.600 and 0.700, provide a relatively high proportion of low molecular weight olefins and a relatively low amount of wax, i.e., less than about 10% by weight. Catalysts with moderate alpha values, i.e., between 0.700 and 0.800, provide a moderate proportion of low molecular weight olefins and a moderate amount of wax, i.e., between about 2 and 10% by weight.

The products of this reaction are fed into the second stage where the chain growth probabilities are relatively high, for example, using catalysts with an alpha value above about 0.800, and preferably, above about 0.850. As a general rule, as the alpha value of the catalyst increases, the amount of methane production decreases.

Paraffins produced in the first reaction are largely inert under these conditions. The low molecular weight ($C_{2-8}$, preferably $C_{2-4}$) olefins compete with heavier molecular weight olefins for chain initiation, and fewer chains are initiated at $C_{20}+$ than if syngas alone is used as feed for a Fischer-Tropsch reaction using the same catalyst.

Using the process described herein, most chains in the second stage of the Fischer-Tropsch process are initiated at $C_{2-8}$, resulting in moderate chain growth probability which produces a relatively larger fraction in the $C_{5-12}$ range. In this manner, wax yield is minimized. One of the benefits of performing the two-stage Fischer-Tropsch reaction is that the use of a hydrocracker can be minimized or, ideally, eliminated altogether.

While not wishing to be bound to a particular theory, the presence of ethylene and other lower molecular weight olefins in the feed to the second reactor is believed to compete with higher olefins. This provides a product with an overall lower average molecular weight than if the reaction is done in the absence of added olefins. Ethylene, in particular, is unhindered at both ends, and therefore has twice the probability of starting a chain than an olefin hindered at one end. Larger molecular weight olefins, while resting on the catalyst bed, can either be hydrogenated to form paraffinic products that are largely inert, or can compete with the smaller olefins to be incorporated into the growing chain. What is generally observed is that the large olefins tend to be hydrogenated rather than being incorporated into the growing chain.

Fischer-Tropsch Chemistry

In Fischer-Tropsch chemistry, syngas is converted to liquid hydrocarbons by contact with a Fischer-Tropsch catalyst under reactive conditions. Depending on the quality of the syngas, it may be desirable to purify the syngas prior to the Fischer-Tropsch reactor to remove carbon dioxide produced during the syngas reaction and any sulfur compounds, if they have not already been removed. This can be accomplished, for example, by contacting the syngas with a mildly alkaline solution (e.g., aqueous potassium carbonate) in a packed column.

Examples of conditions for performing Fischer-Tropsch type reactions are well known to those of skill in the art. Suitable conditions are described, for example, in U.S. Pat. Nos. 4,704,487, 4,507,517, 4,599,474, 4,704,493, 4,709,108, 4,734,537, 4,814,533, 4,814,534 and 4,814,538, the contents of each of which are hereby incorporated by reference in their entirety.

In general, Fischer-Tropsch catalysts contain a Group VIII transition metal on a metal oxide support. The catalysts may also contain a noble metal promoter(s) and/or crystalline molecular sieves. Certain catalysts are known to provide chain growth probabilities that are relatively low to moderate, and the product of the reaction includes a relatively high proportion of low molecular ($C_{2-8}$) weight olefins and a relatively low proportion of high molecular weight ($C_{30}+$) waxes. Certain other catalysts are known to provide relatively high chain growth probabilities. Such catalysts are well known to those of skill in the art and can be readily obtained and/or prepared.

Catalyst Selection

Catalysts With Low Chain Growth Probabilities

For the first stage of the Fischer-Tropsch reaction, any catalyst that provides relatively low to moderate chain growth probabilities can be used. Typically, catalysts with an alpha value between about 0.600 and 0.700 provide low chain growth probabilities. Catalysts with an alpha value between about 0.700 and 0.800 provide moderate chain growth probabilities. Preferable catalysts are those which tend to provide high yields (i.e., greater than about 20, and, more preferably, greater than about 30 percent by weight of the products other than methane) of light ($C_{2-8}$) alpha olefins.

Preferably, the catalyst used in the first stage is an iron-containing catalyst. Iron itself can be used and, when iron oxides are formed, can be reduced with hydrogen back to iron. However, because the presence of iron fines in the product stream is not preferred, and because iron oxides (rust) decrease the surface area of the catalyst available for reaction, other iron-containing catalysts may be preferred. Examples of suitable iron-containing catalysts include those described in U.S. Pat. No. 4,544,674 to Fiato et al. and Xu et al., pp. 47–53, *Chemtech* (Jan. 1998).

In a preferred embodiment, the iron catalysts include at least about 10 to about 60 weight percent iron. More preferably, they include between about 20 to about 60 weight percent iron, and most preferably about 30 to about 50 weight percent iron. These catalysts can be unsupported, but are preferably promoted with a refractory metal oxide ($SiO_2$, $Al_2O_3$, etc.), alkali (K, Na, Rb) and/or Group IB metals (Cu, Ag). These catalysts are usually calcined, but usually are not reduced. Rather they are brought up to reaction temperature directly in the $CO/H_2$ feed.

Co-precipitated iron-based catalysts, including those containing cobalt, can be used. High levels of cobalt in an iron-cobalt alloy are known to produce enhanced selectivity to olefinic products, as described, for example, in *Stud. Surf. Sci. Catal.* 7, Pt/A, p. 432 (1981).

Examples of co-precipitated iron-cobalt catalysts and/or alloys include those described in U.S. Pat. Nos. 2,850,515, 2,686,195, 2,662,090, and 2,735,862; *AICHE* 1981 Summer Nat'l Meeting Preprint No. 408, "The Synthesis of Light Hydrocarbons from CO and $H_2$ Mixtures over Selected Metal Catalysts" ACS 173rd Symposium, Fuel Division, New Orleans, March 1977; *J. Catalysis* 1981, No. 72(1), pp. 37–50; Adv. Chem. Ser. 1981, 194, 573–88; Physics Reports (Section C of Physics Letters) 12 No. 5 (1974) pp. 335–374; UK patent application No. 2050859A; *J. Catalysis* 72, 95–110 (1981); Gmelins Handbuch der Anorganische Chemie 8, Auflage (1959), pg. 59; Hydrocarbon Processing, May 1983, pp. 88–96; and Chem. Ing. Tech. 49 (1977) No. 6, pp. 463–468.

Methods for producing high surface area metal oxides are described, for example, in the French article, "*C. R. Acad. Sc. Paris*", p. 268 (May 28, 1969) by P. Courte and B. Delmon. Metal oxides with a high surface area are prepared by evaporating to dryness aqueous solutions of the corresponding glycolic acid, lactic acid, malic or tartaric acid metal salts. One oxide that was prepared was $CoFe_2O_4$.

Iron-cobalt spinels which contain low levels of cobalt, in an iron/cobalt atomic ratio of 7:1 to 35:1, are converted to Fischer-Tropsch catalysts upon reduction and carbiding (see, for example, U.S. Pat. No. 4,544,674 to Fiato et al.). These catalysts tend to exhibit high activity and selectivity for $C_2$–$C_6$ olefins and low methane production.

The contents of each of the patents and publications referred to above is hereby incorporated by reference.

Catalysts With High Chain Growth Probabilities

For the second stage of the Fischer-Tropsch chemistry, any catalyst that provides relatively high chain growth probabilities can be used. Preferably, the catalyst used in the second stage is a cobalt-containing catalyst. Ruthenium is also an effective Fischer-Tropsch catalyst, but is more expensive.

One suitable cobalt catalyst that can be used is described in U.S. Pat. No. 4,579,986, as satisfying the relationship:

$$(3+4R) > L/S > (0.3+0.4R),$$

wherein:
L=the total quantity of cobalt present on the catalyst, expressed as mg Co/ml catalyst;
S=the surface area of the catalyst, expressed as $m^2$/ml catalyst; and
R=the weight ratio of the quantity of cobalt deposited on the catalyst by kneading to the total quantity of cobalt present on the catalyst.

Other suitable catalysts include those described in U.S. Pat. Nos. 4,077,995, 4,039,302, 4,151,190, 4,088,671, 4,042,614 and 4,171,320. U.S. Pat. No. 4,077,995 discloses a catalyst that includes a sulfided mixture of CoO, $Al_2O_3$ and ZnO. U.S. Pat. No. 4,039,302 discloses a mixture of the oxides of Co, Al, Zn and Mo. U.S. Pat. No. 4,151,190 discloses a metal oxide or sulfide of Mo, W, Re, Ru, Ni or Pt, plus an alkali or alkaline earth metal, with Mo-K on carbon being preferred.

U.S. Pat. No. 4,088,671 discloses minimizing methane production by using a small amount of ruthenium on a cobalt catalyst. Supported ruthenium catalysts suitable for hydrocarbon synthesis via Fischer-Tropsch reactions are disclosed, for example, in U.S. Pat. Nos. 4,042,614 and 4,171,320.

In general, the amount of cobalt present in the catalyst is between about 1 and about 50 weight percent of the total catalyst composition, more preferably between about 10.0 and 25 weight percent.

Preferably, the catalyst contains between about 3 and 60 ppw cobalt, between 0.1 and 100 ppw of at least one of zirconium, titanium or chromium per 100 ppw of support (typically, silica, alumina, or silica-alumina and mixtures thereof).

Catalyst Supports

The type of support used can influence methane production. Suitable metal oxide supports or matrices which can be used to minimize methane production include alumina, titania, silica, magnesium oxide, alkaline earth titanates, alkali titanates, rare earth titanates and mixtures thereof.

Methane production can be decreased using supported ruthenium catalysts. Titania or titania-containing supports provide lower methane production than, for example, silica, alumina or manganese oxide supports. Accordingly, titania and titania-containing supports are preferred.

Typically, the catalysts have a particle size of between 10 and 110 microns, preferably between 20 and 80 microns, more preferably between 25 and 65 microns, and have a density of between 0.25 and 0.9 g/cc, preferably between 0.3 and 0.75 g/cc. The catalysts typically include one or more of the above-mentioned catalytic metals, preferably including iron in the first stage and cobalt in the second stage, on one of the above-mentioned catalyst supports. Preferably, the cobalt-containing catalysts include about 10 to 14 percent cobalt on a low density fluid support, for example, alumina, silica and the like, having a density within the ranges set forth above for the catalyst.

Promoters and Noble Metals

Methane selectivity is also influenced by the choice of promoter. Alkali metal promoters are known for reducing the methane selectivities of iron catalysts. Noble metals, such as ruthenium, supported on inorganic refractory oxide supports, exhibit superior hydrocarbon synthesis characteristics with relatively low methane production. Where a noble metal is used, platinum and palladium are generally preferred. Accordingly, alkali metal promoters and/or noble metals can be included in the catalyst bed of the first stage provided that they do not significantly alter the reaction kinetics from slow chain growth probabilities to fast chain growth probabilities.

Manganese Salts

The tendency for olefins to be readily hydrogenated on the cobalt catalyst tends to minimize the overall yield Of $C_5$+ products. The presence of manganese and manganese salts in the catalyst and/or support tends to decrease the rate of olefin hydrogenation, and, for this reason, is preferred. Examples of suitable manganese-containing materials that can be used include manganese-containing zeolites, unsupported and alumina-supported manganese oxide catalysts, manganese molybdate. Examples of manganese oxide-containing catalysts and/or supports include MnO, $Al_2O_3$—MnO, $SiO_2$—MnO, MnO-carbon, Group IVB-manganese oxides, Group VB-manganese oxides, Group IA (alkali metal)-manganese oxides, Group IIA (alkaline earth metal)-manganese oxides and rare earth-manganese oxides and mixtures thereof. The preferred support is manganese oxide.

Suitable manganese-containing catalysts are described, for example, in U.S. Pat. Nos. 4,206,134 and 5,162,284. When these catalysts are used in Fischer-Tropsch chemistry under certain conditions, Cu-promoted $Co_2MnO_4$ showed an increased olefin content in the products versus Cu-promoted $Co_3O_4$. U.S. Pat. No. 4,206,134 discloses using MnO-supported Ru catalysts which also show this effect. U.S. Pat. No. 4,624,968 discloses using an iron/manganese/potassium catalyst in Fischer-Tropsch synthesis. These catalysts are suitable for use in the first stage Fischer-Tropsch reaction.

Catalysts in spinel form have been formed which include cobalt and manganese, in particular, copper-promoted cobalt-manganese spinels with the formula $CO_{3-x}MnO_4$ where x is from about 0.5 to about 1.2, preferably from about 0.7 to about 1.0, most preferably about 1.0. The ratio of cobalt to manganese in the spinel is between about 1.5:1 and about 5:1. The amount of copper promoter in the composition is preferably from about 0.1 to about 5 gram atom percent based on the total gram atoms of cobalt and manganese of the dry composition, more preferably from about 0.5 to about 2.0 weight percent. Copper-promoted cobalt-manganese catalysts appear to be significantly more active, and also better at minimizing olefin hydrogenation, than analogs promoted with copper but not containing manganese, or catalysts containing manganese but not promoted with copper.

Ruthenium-containing catalysts can be used with manganese oxide, other manganese-containing oxides or mixtures of various manganese oxides as a catalyst support. These catalysts are suitable for use in the second stage Fischer-Tropsch reaction.

The disclosures of each of the patents and articles discussed above are incorporated herein by reference in their entirety.

Synthesis Gas

Typically, the synthesis gas will contain hydrogen and carbon monoxide, and may include minor amounts of carbon dioxide and/or water. In the first stage, the ratio of hydrogen/carbon monoxide is between about 0.5 and 1.0, preferably around 0.5. In the second stage, the ratio of hydrogen/carbon monoxide is preferably greater than 1.0, more preferably between about 1.0 and 2.0, still more preferably between about 1.0 and 1.5. A hydrogen/carbon monoxide ratio of 1.0 or less results in the formation of a relatively large proportion of oxygenated products, and for this reason, should be avoided. Ratios above about 1.5 tend to hydrogenate a relatively large portion of the olefins in the second stage before they can participate in chain growth reactions. Although the amount of hydrogen tends to increase in the first stage as carbon monoxide is consumed, additional hydrogen can be added to achieve a desired ratio. The syngas feed in the second stage can be adjusted to provide suitable ratios of hydrogen to carbon monoxide. The syngas feed in the second stage is also preferably adjusted to give a ratio of olefins/CO of between about 0.05 and 0.5 by weight. Below ratios of about 0.05, there tends to be not enough olefin to get a significantly useful effect.

Operating Conditions

The first stage of the Fischer-Tropsch reaction is typically conducted at temperatures between about 270° C. and 280° C., at a pressure of between about 1 and 20 ATM, in a slurry reactor or a fluidized bed reactor. Typical synthesis gas linear velocity ranges in the reactor are between about 2 and 40 cm per sec., preferably between about 6 and 10 cm per sec. After the first stage, the mixture is preferably cooled to less than 100° C., more preferably below about 80° C., and still more preferably below about 70° C. When the mixture is cooled, water and optionally a $C_5+$ fraction can be removed.

The resulting reaction mixture includes $C_{2-4}$ olefins and paraffins, $C_5+$ products, and about 40% by weight syngas. The products in the $C_{2-4}$ range are typically present in a ratio of about 75% olefins/25% paraffins by weight. The product mixture also tends to include water and about 5% carbon dioxide and 5% methane by weight. The reaction mixture is then added to the second stage Fischer-Tropsch reactor with additional syngas.

The second stage of the Fischer-Tropsch reaction is typically conducted in either a fixed bed reactor or a slurry reactor, where slurry reactors are preferred. The operating temperature of the fixed bed reactor is between about 200° C. and 225° C., and the operating temperature of the slurry reactor is between about 225° C. and 250° C., with a temperature around 240° C. preferred. Typical synthesis gas linear velocity ranges in the reactor are from about 2 to 40 cm per sec., preferably from about 6 to 10 cm per sec. The pressure is preferably between about 1 and 30 ATM, with pressures between 20 and 30 ATM being particularly preferred. Above about 30 ATM, carbonyls may be formed and, therefore, pressures significantly about 30 ATM are not preferred. Further, the rate of reaction tends to increase with increased pressure, but tends to level off due to hydrodynamic problems at around 30 ATM.

The catalyst space velocities are typically between about 100 and 10,000 cc/g/h, preferably between about 300 and 3,000 cc/g/h, for both stages.

Following the second stage, the reaction mixture is preferably cooled to less than 100° C., and liquid products are trapped. Methane is preferably bled off to a syngas generator and recycled. Water is preferably removed.

As discussed above, slurry reactors can be preferred for one or both of the stages. Bubble column slurry reactors can be particularly preferred. Details regarding bubble column slurry reactors can be found, for example, in Y. T. Shah et al., Design Parameters Estimations for Bubble Column Reactors, *AIChE Journal*, 28 No. 3 pp. 353–379 (May 1982); Ramachandran et al., Bubble Column Slurry Reactor, Three-Phase Catalytic Reactors Chapter 10, pp. 308–332 Gordon and Broch Science Publishers (1983); Deckwer et al., Modeling the Fischer-Tropsch Synthesis in the Slurry Phase, Ind. Eng. Chem. Process Des. Dev. v 21, No. 2, pp. 231–241 (1982); Kölbel et al., The Fischer-Tropsch Synthesis in the Liquid Phase, Catal. Rev.-Sci. Eng., v. 21(n), pp. 225–274 (1980); and U.S. Pat. No. 5,348,982, the contents of each of which are hereby incorporated by reference in their entirety.

Since the catalyst metal may be present in the catalyst in the form of an oxide, the catalyst may be reduced with hydrogen prior to contact with the slurry liquid. The starting slurry liquid is typically a heavy hydrocarbon that is viscous enough to keep the catalyst particles suspended (typically a viscosity between 4 and 100 centistokes at 100° C.) and a low enough volatility to avoid vaporization during operation (typically an initial boiling point range of between about 350° C. and 550° C.). The slurry liquid is preferably essentially free of contaminants such as sulfur, phosphorous or chlorine compounds. Initially, it may be desirable to use a synthetic hydrocarbon fluid such as a synthetic olefin oligomer as the slurry fluid.

Often, a paraffin fraction of the product having the desired viscosity and volatility is recycled as the slurry liquid. The slurry typically has a catalyst concentration of between about 2 and 40 percent catalyst, preferably between about 5 and 20 percent, and more preferably between about 7 and 15 percent catalyst based on the total weight of the catalyst, i.e., metal plus support.

Preferably, each reactor converts about 60% or more of the syngas to products, and the overall yield is preferably about 80% or greater, more preferably, about 90% or greater. In the first stage, above about 60% conversion, carbon dioxide production tends to increase, which is not preferred. The conversion in the second stage can go higher than about 60%. The product distribution tends to be about 50% hydrocarbons boiling in the diesel range, with up to 70% between $C_5$ and $C_{20}$, and with about 15% or less in the $C_{1-4}$ range, and about 15% or less in the $C_{20-50}$ range.

Although the stages described herein are described in terms of a Fischer-Tropsch reaction, these stages can optionally be performed using various modifications of the literal Fischer-Tropsch process where hydrogen (or water) and carbon monoxide (or carbon dioxide) are converted to hydrocarbons (e.g., paraffins, ethers, etc.). Thus, the term Fischer-Tropsch type product or process is intended to apply to Fischer-Tropsch processes and products and the various modifications thereof and the products thereof. For example, the term is intended to apply to the Kolbel-Engelhardt process typically described by the reaction:

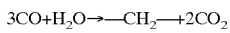

$$3CO + H_2O \rightarrow -CH_2- + 2CO_2$$

The $CO_2$ product can be returned to the syngas generator and combined with methane (and some air) to form additional syngas.

The Separation of Product From the Fischer-Tropsch Reaction

The products from Fischer-Tropsch reactions generally include a gaseous reaction product and a liquid reaction product. The gaseous reaction product includes hydrocarbons boiling below about 650° F. (e.g., tail gases through middle distillates). The liquid reaction product (the condensate fraction) includes hydrocarbons boiling above about 650° F. (e.g., vacuum gas oil through heavy paraffins).

The minus 650° F. product can be separated into a tail gas fraction and a condensate fraction, i.e., about $C_5$ to $C_{20}$ normal paraffins and higher boiling hydrocarbons, using, for example, a high pressure and/or lower temperature vapor-liquid separator or low pressure separators or a combination of separators.

The fraction boiling above about 650° F. (the condensate fraction) is typically separated into a wax fraction boiling in the range of about 650° F.–1200° F. after removing particulate catalyst fines and one or more fractions boiling above about 1200° F. The wax fraction primarily contains $C_{20}$ to $C_{50}$ linear paraffins with relatively small amounts of higher boiling branched paraffins. Typically, the separation is effected by fractional distillation.

Optional Process Steps

The presence of sulfur, nitrogen, halogen, selenium, phosphorus and arsenic contaminants in the feedstock is undesirable. For this reason, it is preferred to remove sulfur and other contaminants from the feed before performing the Fischer-Tropsch chemistry. Means for removing these contaminants are well known to those of skill in the art. For example, ZnO guardbeds are preferred for removing sulfur impurities. Means for removing other contaminants are well known to those of skill in the art.

In one embodiment, any methane produced by the reaction is recovered and converted to synthesis gas for recycling in the process. Alternatively, the entire product stream from the first reactor can be added to the second reactor.

In some embodiments, the product stream from the second stage may contain a relatively large amount of olefins that can be hydrogenated following the Fischer-Tropsch chemistry. Optionally, these olefins can be isomerized prior to hydrogenation to provide branched paraffins. Branching may be advantageous in a number of end-uses, particularly when increased octane values (when the compositions are used as fuels) or decreased pour points are desired.

After the reaction mixture is converted to the final product stream, the desired products can be isolated, for example, by distillation. $C_{1-4}$ products can be obtained and used to form synthesis gas for subsequent use in the process described herein. $C_{5-12}$ products can be isolated and used, for example, as combustible fuels.

Higher molecular weight products can either be isolated and used directly, or can be reacted to form lower molecular weight products, as desired. For example, high molecular weight products can be hydrocracked to provide lower molecular weight products, increasing the yield of liquid combustible fuels.

Hydrocracking refers to a catalytic process, usually carried out in the presence of free hydrogen, in which the cracking of the larger hydrocarbon molecules is a primary purpose of the operation. Desulfurization and/or denitrification of the feed stock usually will also occur.

Catalysts used in carrying out hydrocracking operations are well known in the art, and it should not be necessary to describe them in detail here. See, for example, U.S. Pat. Nos. 4,347,121 and 4,810,357 for general descriptions of hydrotreating, hydrocracking, and typical catalysts used in each process. The product from the hydrocracking can be subject to distillation and/or catalytic isomerization to provide lube oils, diesel fuel, and the like.

Optionally, an acid catalyst can be added to the reaction mixture in either stage, but preferably in the second stage. When $C_4+$ alpha-olefins are produced, the alpha-olefins isomerize to more substituted olefins in the presence of the acid catalyst. This reduces the chain growth probability for $C_4+$ and largely minimizes wax formation.

The process will be readily understood by referring to the flow diagram in FIG. 4. In FIG. 4, a mixture of carbon monoxide and hydrogen (syngas) is added to a first stage Fischer-Tropsch reactor (Box 10). The products are cooled, water is removed and the $C_5+$ fraction is isolated via distillation (Box 40) and contained in Box 20. The $C_{1-4}$ fraction and additional syngas is sent to a second stage Fischer-Tropsch reactor (Box 30). The product of the reaction is fractionally distilled (Box 40). The $C_{1-4}$ fraction is sent to a syngas generator (Box 50). The $C_{5-20}$ fraction is collected (Box 20) separately from the $C_{20}+$ fraction, which is optionally hydrocracked and/or hydrotreated (Box 60). In the flow scheme contained in FIG. 4, the process of the present invention is practiced in continuous operation. However, it is possible to practice the present invention in batch operation.

The following example will help to further illustrate the invention but are not intended to be a limitation on of the scope of the process.

Example 1

Addition of ethylene to a Cobalt-Catalyzed Fischer-Tropsch Reaction

EXPERIMENTAL

CRLA -2B Catalyst

The catalyst had a nominal composition of 20 wt. % Co, 0.5 wt. % Ru, 1 wt. % $La_2O_3$, and 78.5 wt. % $Al_2O_3$. It was prepared from a Ketjen fluid alumina by suspending the alumina in a hot (80° C.) aqueous solution of the nitrate salts of Co, Ru, and La (nitrosyl nitrate for Ru). A hot aqueous solution of potassium carbonate was added to the suspended alumina with vigorous stirring. The metals then precipitated onto the support as hydroxides. The solids were filtered and washed several times with hot distilled water, then calcined in a fluid bed reactor by heating them slowly in air to 300° C. They were cooled to room temperature, then reduced by heating them slowly (1° C./min.) to 350° C. in pure hydrogen at atmospheric pressure. The reducing gas flow equaled or exceeded 1800 cc/g/h. After cooling and purging with nitrogen, the reduced catalyst was passivated by adding enough dilute air at ambient temperature to reoxidize the metals completely, at a slow enough rate that the oxidation exotherm did not exceed 50° C. A hydrogen TPD test indicated that the Co dispersion of the catalyst was about 10%.

Tests with Pure Synthesis Gas

Tests of the fluid catalyst were made on 4-gram quantities of the fluid particles in a fixed bed reactor after they were diluted with an equal volume of 0.5 mm glass beads. The temperature control was within ±1° C. under all conditions. Activation was done in hydrogen at atmospheric pressure at a flow rate of 1800 cc/g/h. The heating rate was 1° C./min. to 350° C. and the hold at that temperature was two hours. After activation, the catalyst was cooled in hydrogen to 185° C. for the start of the synthesis run. Initial startup was at 185° C. and 1 atm with a 900 cc/g/h flow of synthesis gas having $H_2/CO=1.5$.

Those conditions were maintained for one hour before switching to the experimental conditions.

Tests with Synthesis Gas plus Ethylene and/or Water

Tests with added ethylene were made after the catalyst was started up in pure synthesis gas at 185° C. and operated for at least one hour at that condition before it was heated to 200° C. During the tests, ethylene was added at either a 1:2 or 1:1 mole ratio with CO. Total flow rates were adjusted to 900 cc/g/h or 1800 cc/g/h. To examine the effects of added water on Fischer-Tropsch synthesis and olefin hydrogenation, inlet gases were passed through a saturator held at 22° C. This produced a reactant stream containing 2.6 vol. % water.

RESULTS

All experiments were run at 200° C. and one atmosphere pressure. Compositions of the inlet streams and flow rates for each experiment are shown in Table 1 and Table 2.

TABLE 1

Synthesis Gas Conversion over CoRu—$La_2O_3$/Alumina

| | | | | | | | | |
|---|---|---|---|---|---|---|---|---|
| Temperature, ° C. | 200 | 200 | 200 | 200 | 200 | 200 | 200 | 200 |
| Pressure, atm | 1 | 1 | 5 | 5 | 1 | 1 | 5 | 5 |
| $H_2$/CO Ratio | 1.5 | 1.5 | 1.5 | 1.5 | 1.0 | 1.0 | 1.0 | 1.0 |
| CO GHSV, cc/g/h | 720 | 360 | 720 | 360 | 720 | 360 | 720 | 360 |
| $H_2$ GHSV, cc/g/h | 1080 | 540 | 1080 | 540 | 1080 | 540 | 1080 | 540 |
| CO Conversion, % | 33.0 | 53.9 | 52.8 | 72.6 | 20.3 | 29.3 | 29.4 | 44.9 |
| CO Rate, cc/g/h | 238 | 194 | 380 | 261 | 183 | 132 | 265 | 202 |
| $H_2$ Conversion, % | 46.2 | 66.7 | 71.6 | 91.0 | 38.9 | 61.7 | 66.8 | 84.7 |
| $H_2$ Rate, cc/g/h | 499 | 360 | 773 | 491 | 350 | 278 | 601 | 381 |
| Product Wt % | | | | | | | | |
| $H_2O$ | 46.9 | 42.7 | 49.7 | 38.0 | 48.4 | 52.5 | 52.0 | 48.1 |
| $CO_2$ | 16.4 | 20.0 | 9.2 | 23.6 | 7.7 | 9.0 | 5.8 | 11.7 |
| $CH_4$ | 9.3 | 8.0 | 8.4 | 8.3 | 6.4 | 6.0 | 5.3 | 4.5 |
| $C_2$–$C_4$ | 10.6 | 10.2 | 7.2 | 6.3 | 8.7 | 8.3 | 6.2 | 5.0 |
| $C_{5+}$ | 16.8 | 19.2 | 25.6 | 23.9 | 28.8 | 24.1 | 30.7 | 30.7 |
| $H_2O$ Rate, g/g/h | 0.160 | 0.117 | 0.270 | 0.141 | 0.126 | 0.099 | 0.200 | 0.138 |
| $CO_2$ Rate, g/g/h | 0.056 | 0.055 | 0.050 | 0.087 | 0.020 | 0.017 | 0.022 | 0.034 |
| $CH_4$ Rate, g/g/h | 0.031 | 0.021 | 0.046 | 0.031 | 0.015 | 0.010 | 0.022 | 0.013 |
| $C_2$–$C_4$ Rate, g/g/h | 0.035 | 0.027 | 0.039 | 0.024 | 0.020 | 0.014 | 0.026 | 0.014 |
| $C_{5+}$ Rate, g/g/h | 0.056 | 0.050 | 0.141 | 0.088 | 0.069 | 0.042 | 0.125 | 0.090 |
| Total HC Rate, g/g/h | 0.122 | 0.098 | 0.226 | 0.143 | 0.104 | 0.066 | 0.173 | 0.117 |

TABLE 2

Synthesis Gas Conversion over CoRu—$La_2O_3$/Alumina

| | | | | | | | | |
|---|---|---|---|---|---|---|---|---|
| Temperature, ° C. | 200 | 200 | 200 | 200 | 200 | 200 | 200 | 200 |
| Pressure, atm | 1 | 1 | 5 | 5 | 1 | 1 | 5 | 5 |
| $H_2$/CO Ratio | 1.5 | 1.5 | 1.5 | 1.5 | 1.0 | 1.0 | 1.0 | 1.0 |
| CO GHSV, cc/g/h | 701 | 584 | 701 | 584 | 877 | 701 | 877 | 701 |
| $H_2$ GHSV, cc/g/h | 1052 | 877 | 1052 | 877 | 877 | 701 | 877 | 701 |
| $C_2H_4$ GHSV, cc/g/h | 0 | 292 | 0 | 292 | 0 | 351 | 0 | 351 |
| $H_2O$ GHSV, cc/g/h | 47 | 47 | 47 | 47 | 47 | 47 | 47 | 47 |
| CO Conversion, | 30 | 19 | 32 | 33 | 17 | 14 | 22 | 22 |
| $C_2H_4$ Conversion, % | — | 67 | — | 75 | — | 51 | — | 67 |
| $C_2H_4$ to $C_{3+}$, % | — | 44 | — | 35 | — | 48 | — | 50 |
| $H_2$ Conversion, % | 45 | 39 | 46 | 62 | 35 | 40 | 67 | 69 |

TABLE 2-continued

Synthesis Gas Conversion over CoRu—$La_2O_3$/Alumina

| Product Weight, | | | | | | | | |
|---|---|---|---|---|---|---|---|---|
| $H_2O$ | 50 | 28.9 | 46.9 | 40.1 | 41.4 | 29.8 | 45.9 | 33.4 |
| $CO_2$ | 11.2 | 5.3 | 5.6 | 6.3 | 23.9 | 11.6 | 4.7 | 4.4 |
| $CH_4$ | 9.5 | 6 | 7.7 | 4.9 | 7.6 | 4.3 | 5.5 | 3.2 |
| $C_2$–$C_4$ | 11.2 | 23.2 | 8 | 10.4 | 10.3 | 22.1 | 6.4 | 11.1 |
| $C_{5+}$ | 18.2 | 36.5 | 31.8 | 38.3 | 16.9 | 32.3 | 37.5 | 48 |
| Product Rates | | | | | | | | |
| $H_2O$ Rate, g/g/h | 0.132 | 0.058 | 0.152 | 0.147 | 0.100 | 0.075 | 0.117 | 0.115 |
| $CO_2$ Rate, g/g/h | 0.026 | 0.024 | 0.018 | 0.023 | 0.041 | 0.039 | 0.012 | 0.015 |
| $CH_4$ Rate, g/g/h | 0.016 | 0.012 −0.004 | 0.025 | 0.018 −0.007 | 0.019 | 0.011 −0.008 | 0.014 | 0.011 −0.003 |
| $C_2$–$C_4$ Rate, g/g/h | 0.022 | 0.045 | 0.026 | 0.038 | 0.023 | 0.058 | 0.016 | 0.038 |
| $C_5$+ Rate, g/g/h | 0.048 | 0.063 +0.015 | 0.101 | 0.143 +0.042 | 0.041 | 0.087 +0.046 | 0.097 | 0.168 +0.071 |
| Total $CH_x$ Rate, g/g/h | 0.086 | 0.120 +0.034 | 0.152 | 0.199 +0.047 | 0.083 | 0.156 +0.073 | 0.127 | 0.217 +0.080 |

For experiments with added ethylene, the $C_2$ fraction was excluded from the product analyses.

Synthesis Gas Only

Results at several flow rates over the fluid CoRu catalyst operating at one atmosphere and 200° C. are shown in Table 1. Conversions were high for these runs, and the main change with flow rate was a change in the conversion level and in the amount of $CO_2$ that was produced. The CO conversion rate increased with increasing space velocity (see FIG. 1) and the $CO_2$ formation rate increased almost linearly with increasing CO conversion.

Synthesis Gas Plus Ethylene

Experiments with added ethylene were made at either 1 atm or 5 atm pressure, with or without saturation of the gas feed with water. The water had little effect other than to depress the CO conversion rate slightly. Data for runs with added water are shown in Table 2. The $H_2$/CO ratio in the gas feed was either 1.0 or 1.5, while the amount of added ethylene was either zero or one-half the amount of CO (so that the number of moles of carbon in $C_2H_4$ and CO were equal).

In each case where ethylene was added, the hydrocarbon synthesis rate increased significantly and a large portion of the $C_3$+ products were derived from ethylene. This was not accompanied by a corresponding increase in the methane formation rate. On the contrary, the formation rate for methane decreased when ethylene was added (see Table 2). This would be expected if the main function of ethylene is to initiate new hydrocarbon chains. In that case, the fraction of $C_2$ species at active sites would be expected to decrease as the fraction of $C_2$ species increases.

At one atmosphere pressure, the CO conversion rate declined when ethylene was added, but at five atmospheres pressure it was relatively unaffected by ethylene addition. Also, the increase in hydrocarbon synthesis rate was concentrated mainly in the $C_5$+ fraction at 5 atm pressure, while at 1 atm pressure much of the increase was in $C_3$ and $C_4$ products. These effects are shown in FIG. 2 and FIG. 3.

The increase in $C_5$+ synthesis rates with ethylene addition was much more pronounced at $H_2$/CO=1 than at $H_2$/CO=1.5 (see Table 2, FIG. 2 and FIG. 3). Also, the fraction of ethylene incorporated into $C_3$+ products was greater at that ratio. Thus, the best results for ethylene incorporation into liquid hydrocarbons in these tests were obtained at 5 atm pressure and $H_2$/$C_2H_4$/CO=1:0.5:1.

Lower $H_2$/CO ratios would appear to favor better utilization of added ethylene (less hydrogenation to ethane), but may also cause excessive $CO_2$ production at higher conversion levels or else limit the conversion, since the usage ratio is two $H_2$ molecules per CO molecule. The $H_2$/CO ratio in the reactor will drop with increasing conversion, lowering the conversion rate, unless it is replenished by the water gas shift reaction: $H_2O+CO \rightarrow CO_2+H_2$. It is believed that a ratio of $H_2$/CO of 1.0 is the lowest ratio that should be used.

What is claimed is:

1. An integrated process for preparing liquid fuels, the process comprising:
   (a) subjecting syngas with a hydrogen/carbon monoxide ratio of between about 0.5 and 1.0 to Fischer-Tropsch reaction conditions where the catalyst used for the Fischer-Tropsch reaction is one which provides low to moderate chain growth probabilities and has an alpha value between 0.6–0.8;
   (b) optionally removing water and/or $C_5$+ hydrocarbons from the product stream;
   (c) subjecting the product from step (a) or (b) to Fischer-Tropsch reaction conditions where the catalyst used for the Fischer-Tropsch reaction is one which provides high chain growth probabilities and has an alpha value above 0.8, where the hydrogen/carbon monoxide ratio is between about 1.0 and 2.0; and
   (d) isolating the product of the reaction.

2. The process of claim 1, wherein the catalyst with low to moderate chain growth probabilities is an iron-containing catalyst.

3. The process of claim 1, wherein the catalyst with high chain growth probabilities is a cobalt-containing catalyst.

4. The process of claim 1, wherein step a) is conducted at a temperature between about 270° C. and 280° C. and at a pressure of between about 1 and 20 ATM.

5. The process of claim 1, wherein step (a) is conducted in a slurry reactor or a fluidized bed reactor.

6. The process of claim 1, wherein the product stream is cooled to less than 100° C. and at least a portion of the water produced during the reaction is removed.

7. The process of claim 1, wherein a $C_5$+ fraction is isolated after step (a) and before step (c).

8. The process of claim 1, wherein at least a portion of the olefins prepared in step (a) are isomerized before being subjected to the Fischer-Tropsch reaction conditions in step (c).

9. The process of claim 1, wherein step (c) is conducted at a temperature between about 200° C. and 250° C. and at a pressure between about 1 and 30 ATM.

10. The process of claim 1, wherein the product of step (a) in the $C_{2-4}$ range includes about 75% olefins by weight.

11. The process of claim 1, wherein the Fischer-Tropsch reactions in steps (a) and/or (c) are run in a slurry reactor.

12. The process of claim 1, wherein olefin hydrogenation in steps (a) and/or (c) is minimized by adding a manganese-containing compound to the reaction.

13. The process of claim 1, wherein the hydrogen/carbon monoxide ratio in step (c) is between about 1.0 and 1.5.

14. The process of claim 1, wherein unreacted syngas is recycled.

15. The process of claim 14, wherein a at least a portion of the carbon dioxide is removed from the syngas before it is recycled.

* * * * *